United States Patent [19]
Hollyday

[11] 3,930,210
[45] Dec. 30, 1975

[54] MOUNTED CERAMIC FILTER

[75] Inventor: Robert David Hollyday, Hershey, Pa.

[73] Assignee: AMP Incorporated, Harrisburg, Pa.

[22] Filed: Dec. 12, 1973

[21] Appl. No.: 423,942

[52] U.S. Cl. .................... 333/79; 248/27; 339/128; 339/220 R
[51] Int. Cl.² ...................... G12B 9/04; H02B 1/04
[58] Field of Search ........... 248/27; 333/79; 317/242; 285/159, 162; 339/220 T, 220 C, 220 R, 128

[56] References Cited
UNITED STATES PATENTS

| 2,140,441 | 12/1938 | Clark | 248/27 |
|---|---|---|---|
| 2,141,878 | 12/1938 | Roby | 248/27 |
| 2,973,490 | 2/1961 | Schlicke | 333/79 |
| 3,243,738 | 3/1966 | Schlicke | 317/242 X |
| 3,289,118 | 11/1966 | Garstang | 333/79 |
| 3,434,746 | 3/1969 | Watts | 285/162 |

FOREIGN PATENTS OR APPLICATIONS

| 778,573 | 7/1957 | United Kingdom | 333/79 |

Primary Examiner—E. A. Goldberg
Attorney, Agent, or Firm—Gerald K. Kita

[57] ABSTRACT

The disclosure relates to a filter assembly securable in a panel by driving the filter assembly into an aperture in the panel, the filter assembly automatically locking itself in the panel, yet being easily removable from the panel by means of a tool. This is accomplished by providing a ceramic filter encased within a body of non-resilient electrically conductive material having a drivable region, the body fitting within a tapered locking ring having fingers with internal diameter across the fingers smaller than the diameter of one section of the body, the fingers being driven outwardly by movement of the body thereagainst within the panel to lock the fingers on the panel. The body includes an enlarged flange portion which is utilized for driving the assembly into the panel as well as to lock the assembly in the panel in conjunction with the fingers. The assembly is removed by means of a tool returning the fingers to the pre-locking position.

4 Claims, 3 Drawing Figures

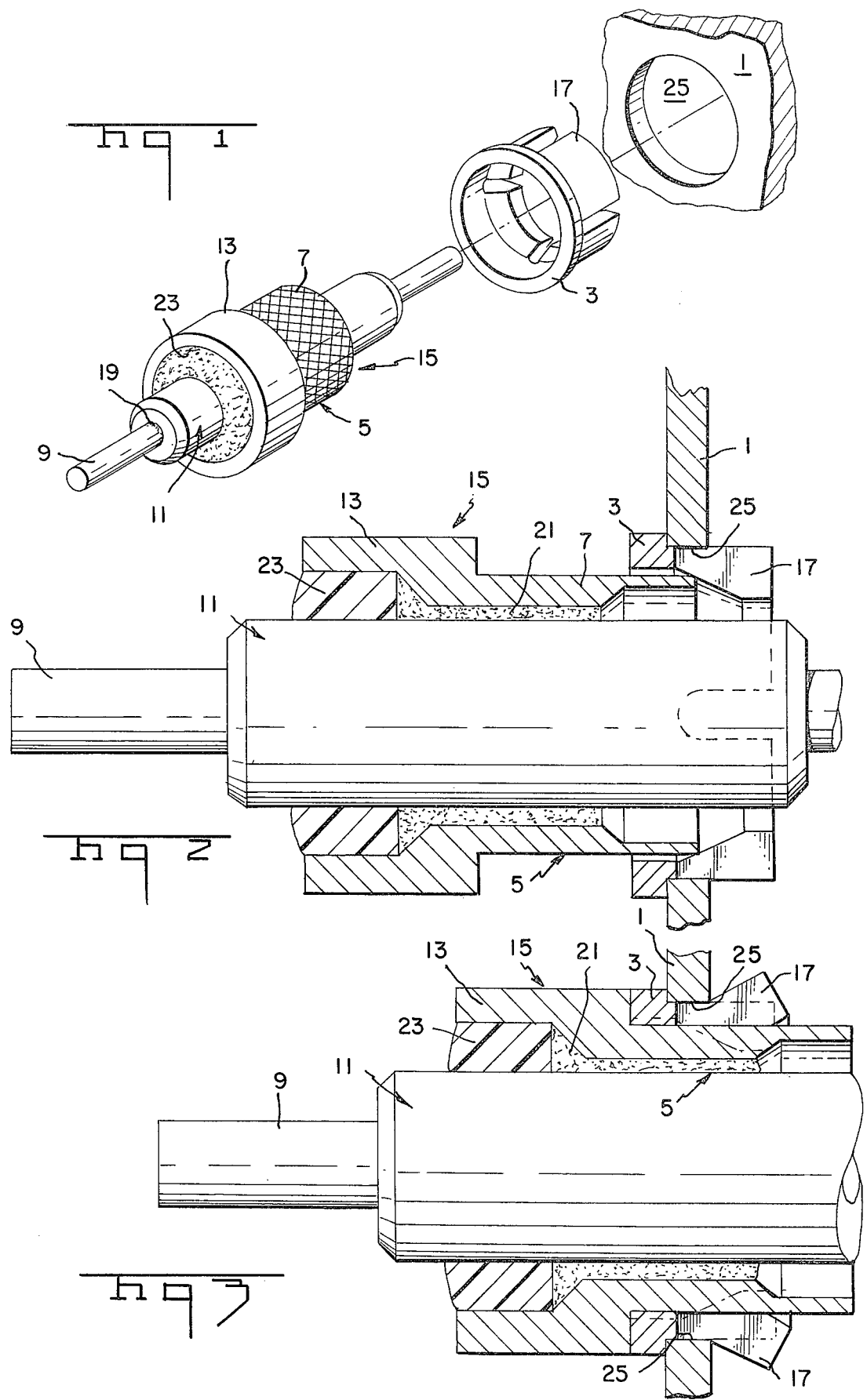

MOUNTED CERAMIC FILTER

This invention relates to a system for mounting a filter assembly in a panel and, more specifically, to a system for driving a filter assembly into a panel wherein the driving operation will lock the filter assembly into the panel.

The mounting of ceramic filter devices into panels and the like has been recognized in the prior art to present problems of filter cracking due to the very brittle nature of ceramic filters. Mounting techniques for such filters have therefore required great care and consequently have involved relatively high installation costs. These prior art techniques normally involved soldering of the filter assembly to the panel. In order to overcome this problem, the soldering was replaced by the use of a screw thread on a body surrounding the filter, the filter and body being driven into the panel. This technique is set forth in my application Ser. No. 324,638, filed Jan. 17, 1973. While this technique is superior to the use of solder, the driving opration requires large driving forces which can affect the operation of the filter. In addition, the tolerance for the panel aperture is critical and the filter is difficult to remove after installation.

In accordance with the present invention there is provided a filter assembly mounting system which substantially overcomes the problems inherent in the prior art techniques and which is quicker to install and remove and requires no heat at the filterpanel joint which could damage any electronics in the immediate area. The drive forces of the present invention are better controlled and the panel aperture size need not be tightly controlled.

Briefly, the above is accomplished by providing a filter assembly securable in a panel by driving the filter assembly into an aperture in the panel, the filter assembly automatically locking itself in the panel, yet being easily removable from the panel by means of a tool. This is accomplished by providing a ceramic filter encased within a body of non-resilient electrically conductive material having a drivable region, the body fitting within a tapered locking ring having fingers with internal diameter across the fingers smaller than the diameter of one section of the body, the fingers being driven outwardly by movement of the body thereagainst within the panel to lock the fingers on the panel. The body includes an enlarged flange portion which is utilized for driving the assembly into the panel as well as to lock the assembly in the panel in conjunction with the fingers. The assembly is removed by means of a tool returning the fingers to the pre-locking position.

It is therefore an object of this invention to provide a filter mounting system which provides relatively easy filter installation.

It is a further object of this invention to provide a filter mounting system wherein the filter is easily installed and removed.

It is a yet further object of this invention to provide a filter mounting system which does not require precision sizing of panel apertures.

It is a still further object of this invention to provide a filter mounting system wherein mounting force requirements are better controlled than in prior art systems.

The above objects and still further objects of the invention will become immediately apparent to those skilled in the art after consideration of the following preferred embodiment thereof, which is provided by way of example and not by way of limitation, wherein:

FIG. 1 is an exploded view of a filter assembly in accordance with the present invention;

FIG. 2 is a cross-sectional view of the filter assembly of FIG. 1 just prior to driving the assembly into the panel; and FIG. 3 is a cross-sectional view as in FIG. 2 after the filter assembly has been driven into the panel.

Referring now to FIG. 1, there is shown the filter assembly 5 in accordance with the present invention. The filter assembly 5 includes an electrically conductive pin 9 which can be formed of copper or the like and which extends beyond both ends of the filter assembly for connection to external devices in well known manner. A ceramic filter sleeve 11 of well known type is positioned around the pin 9 and soldered thereto with solder 19. A body 15 surrounds the sleeve 11. The body 15 is formed from electrically conducting material and is of sufficient hardness to drive the fingers 17 of tapered locking ring 3 as will be explained herein below. The hardness is also sufficient to accept a force axially thereof without applying pressure to the sleeve 11. A heat treated beryllium copper has been found acceptable for this purpose. This does not preclude the use of other materials.

The body 15 includes an enlarged flange portion 13 and a smaller diameter serrated portion 7. The body 15 is secured to the sleeve 11 by means of an electrically conductive solder 21. The solder can be replaced in part by an epoxy 23 as shown in FIGS. 2 and 3. Also provided is a tapered locking ring 3 having fingers 17 thereon. The locking ring 3 is formed from electrically conducting material. The locking ring body portion has an inside diameter which is greater than the diameter of the serrated portion 7 but smaller than the diameter of the flange 13 so that the locking ring can be driven by the flange 13 of the filter assembly 5. The fingers 17 have an enlarged portion extending inwardly so that the inside diameter across the fingers is smaller than the outside diameter of the serrated portion 7. The outside diameter of the fingers 17 is also smaller than the diameter of an aperture 25 in a panel 1 into which the filter assembly is to be mounted. The sizing of the fingers 17 and serrated portion 7 is such that the fingers 17 are driven outwardly when the serrated portion 7 is driven therethrough to extend outwardly a distance greater than the diameter of aperture 25 and lock thereon as will be explained hereinbelow.

Referring now to FIG. 2, the filter assembly 5 is shown mounted within the locking ring 3 with the locking ring mounted in the aperture 25 of panel 1 just prior to driving of the filter assembly into the panel. The body of locking ring 3 abuts the panel 1 and the serrated portion 7 rests against the fingers 17. A force is then provided axially of the filter sleeve 11 against the flange 13 in any desired manner. As shown in FIG. 3, the serrated portion 7 passes through the locking ring 3 and drives the fingers 17 outwardly. The filter assembly continues to be driven into the panel 1 until the flange 13 abuts the body of the locking ring 3 to provide an insertion stop. At this time, the locking ring 3 is locked onto the panel 1 and the filter assembly 5 is frictionally secured within the locking ring due, in part, to the serrations on the serrated portion 7 and also to the inward force from the fingers on the portion 7.

It is apparent that the filter assembly 5 can be easily removed by applying a force axially of the sleeve 11 on the portion 7 extending through the panel 1 to drive the assembly out of the panel. The locking ring 3 is then removed, if desired, by forcing the fingers 17 inwardly.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A filter assembly mounted in an opening in a grounding panel, a tubular ceramic feed through filter, an electrically conductive sleeve of a relatively rigid metal material secured about the filter, a tubular electrically conductive locking ring having an enlarged flange portion abutting said panel and being of larger diameter than the opening and having an inner diameter receiving said sleeve and provided with axially extending angularly spaced fingers, the outer surfaces of the fingers normally lying on a circle of a diameter receivable in the opening extending through and beyond said panel, the fingers being progressively thicker normally inwardly in a direction away from the flange so that their interior surfaces lie against and frictionally engage over said sleeve, portions of the fingers being forcefully driven by said sleeve outwardly beyond the periphery of the opening to frictionally lock the sleeve within said opening.

2. A filter assembly as in claim 1 wherein the sleeve is provided with a radially enlarged outer driving portion engaged against said flange portion.

3. A filter assembly as in claim 2 wherein the outer surface of the sleeve adjacent the enlarged portion is serrated to enhance the frictional engagement with said interior surfaces of said fingers.

4. An assembly as in claim 1 wherein the sleeve is serrated to enhance the frictional engagement with said interior surfaces of said fingers.

* * * * *